Oct. 28, 1941.  W. B. CROSBY  2,260,885
MOUNTING FOR FISHING REELS
Filed April 17, 1940
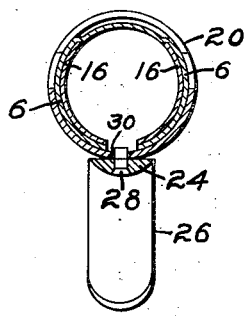
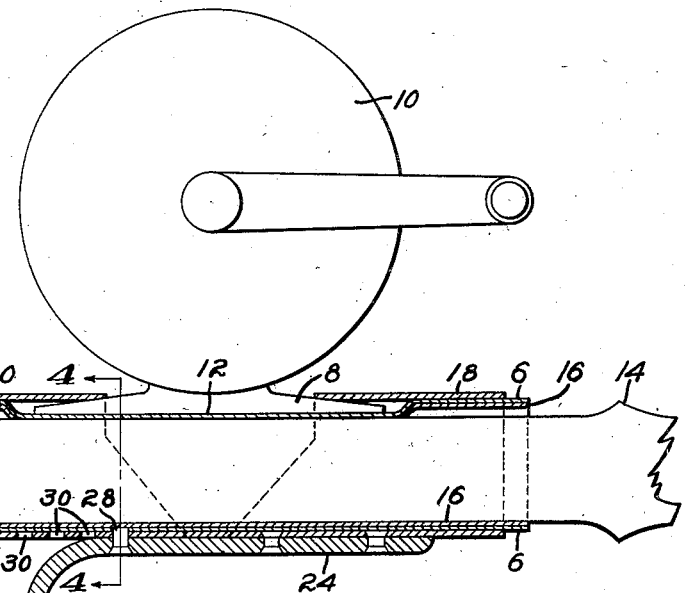
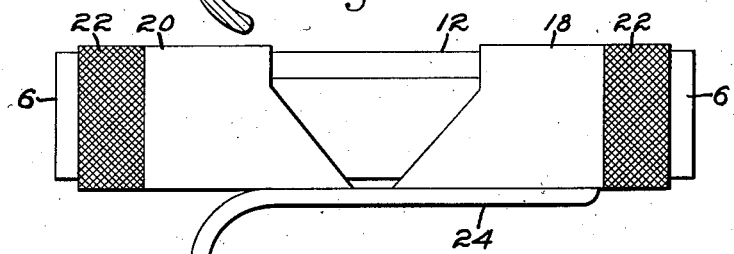
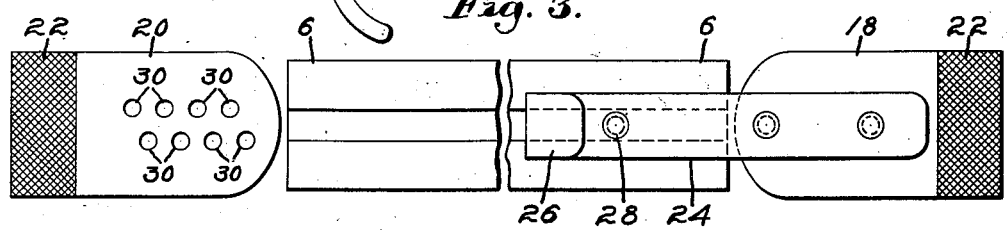
Inventor:
Wilton B. Crosby,
by Emery, Booth, Townsend, Miller & Weidner
Attys.

Patented Oct. 28, 1941

2,260,885

UNITED STATES PATENT OFFICE 2,260,885

MOUNTING FOR FISHING REELS

Wilton B. Crosby, Barnstable, Mass.

Application April 17, 1940, Serial No. 330,086

5 Claims. (Cl. 43—22)

The object of this invention is to provide an improved reel holder for mounting a reel on a fishing rod. The particular holder which I here illustrate and shall describe as an example of the preferred form of the invention provides a self-contained unit readily manipulated without the use of tools for mounting on a rod, which in this instance may be of mere pole without reel-attaching fittings of any kind, and permits a quick change of reels or shifting of the reel to another rod.

My invention will be well understood by reference to the following description taken in connection with the accompanying drawing, wherein—

Fig. 1 is a longitudinal sectional view showing a reel mounted on a rod by a device exemplifying the invention;

Fig. 2 is a side elevation of the mounting detached;

Fig. 3 is a bottom plan view partly broken away of the elements of the mounting in separated position; and Fig. 4 is a section on the line 4—4 of Fig. 1.

In the example of the invention shown I provide a plate 6 for seating on the side of the rod to receive the base 8 of the reel 10, which plate conveniently takes the form of a split tube, as best seen in Figs. 3 and 4, impressed to provide the seat 12 for the base 8 of the reel and, at least in alignment with the end portions of that seat, and in the example shown wherein it is formed of a split tube throughout its length, it extends over the major portion of the circumference of a circle to embrace a major segment of the rod 14 on which it is mounted. The tube 6 preferably takes the form of a light sheet of metal, preferably stainless steel having secured thereto a lining of gripping material 16 which may be rag felt which not only provides a surface adapted to grip the rod when pressed thereagainst but provides stability and body for the thin sheet metal to permit it to subserve its functions in the device. The sleeve 6 may be slid over the rod 14 (see Fig. 1), which in the drawing is illustrated as a simple bamboo pole, and it may expand a little if necessary to pass the various natural joints in the rod or to adapt itself to the diameter of the rod within certain limits.

To maintain the reel on the seat 12 and on the rod I provide suitable securing devices to embrace the ends of the base 8 and the rod. These may take the form of unbroken rings or sleeves 18 and 20, respectively, adapted to slip longitudinally over the rod and embrace the end portions of the base 8, and they may be formed with knurled surfaces 22 at their ends to facilitate their manipulation. It will be understood that the internal diameter of these sleeves is slightly larger than the diameter of the tube to permit them to pass over any joints in the rod 14 and to engage over the ends of the base. They are so constructed, however, that when pressed toward each other over the ends of the base they make a contact therewith serving to wedge the base inwardly toward the center of the rod, this being effected in the example shown by the customary tapered surfaces on the ends of the base 8 and they thus grip the rod and the reel base together.

Suitable means may be provided for securing the sleeves 18 and 20 in their pressed-together position, and I have herein shown an arm 24 secured to sleeve 18 which terminates in an outwardly extending hook 26 constituting a finger-engaging piece to assist in handling the rod in use and also a handle by which traction toward the left in Fig. 1 may be exerted on sleeve 18. From the back of the arm 24 projects a stud 28. When the sleeves are drawn together to the position of Fig. 1, the stud 28 may engage in one or another of a series of holes 30 (see Fig. 3) on the sleeve 20 or conveniently an extension thereof as illustrated. I have herein shown two staggered series of holes to provide for a fine adjustment of the parts, the stud being engageable in the openings of either row by a slight relative angular movement of the two sleeves. The arm 24 is yieldable and the stud 28 therefore snaps into engagement with the opening, providing a snap-acting latch which may, however, be readily released by manipulation of the hook 26. As seen in Fig. 4, the stud may extend entirely through the sleeve 20 since the split tube 6 defines a clearance space between its edges to receive any projection of the stud.

The pressure of the sleeves 18 and 20, when wedged home, tends to collapse or constrict the tube 6 on the rod to give a firm grip on the latter throughout a large area. It also serves to distribute the clamping pressure so that it is not localized in such a manner as to cause excessive weakening at single points.

Referring to Fig. 3, it will be seen that the inner ends of the sleeves adjacent the reel seat 12 lie in planes perpendicular to the axis, thus permitting the slight rotative adjustment to engage the stud 28 with one or another of the rows of holes 30 as above referred to without disturbing the engaging relation of the sleeve and the reel base 8. Preferably the ends of the sleeve opposite the seat are extended beyond this plane, as clearly seen in Fig. 3, so that tipping of the sleeve, for example, a counterclockwise tipping of the sleeve 20, viewing Fig. 1, due to the wedging action, is resisted by an engagement of this extended arm with the rod at a relatively remote point toward the right.

It is apparent that the preferred form of the device illustrated provides a self-contained and unitary device which may be quickly assembled on a rod without requiring any particular preparation of the latter or any particular fittings thereon and by which the reel is quickly and firmly attached without the use of tools. No part of the rod is cut away to weaken it. When the reel is in position there are no sharp corners or projecting parts to catch or scratch the fingers, and, as described, a finger hook 26, desirable in rods, may be incorporated as a part of the structure. The parts are quickly disassembled to permit another reel to be positioned if desired or to permit shifting of the reel and the mounting to another rod.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A self-contained detachable reel mounting comprising a split tube to embrace the major segment of a rod and having located circumferentially remote from the split a seat for the base of a reel constructed and arranged to position such base in a predetermined location on the tube, and a pair of sleeves telescoping on said tube to overlie the ends of the base and means to secure them in varied positions of proximity.

2. A self-contained detachable reel mounting comprising a split tube to embrace the major segment of a rod and having a seat to receive the base of a reel, and a pair of sleeves telescoping on said tube to overlie the ends of the base, one of said sleeves having a longitudinally extending arm terminating in an outwardly extending finger rest and having a distal catch and the other having means cooperating with the catch to secure the sleeves together.

3. A reel mounting for fishing rods comprising a pair of sleeves for embracing the rod and overlying the tapered ends of a reel base, one having a yieldable arm terminating in an outwardly curved hook and which has a stud on the back thereof and the other being recessed to provide for snap engagement of said stud therewith to hold the sleeves in engagement with said base in mutual stressed-together relation.

4. A detachable reel mounting comprising a split tube having a thin yieldable wall with an interior lining of gripping material and presenting exteriorly a seat located circumferentially remote from the split and constructed and arranged to receive and position the base of a reel in a predetermined location on the tube and rings adapted to telescope said tube and the ends of said base and constructed to make a wedging engagement with said ends to constrict the tube about a rod.

5. A reel mounting for fishing rods comprising a pair of sleeves for embracing the rod and having at one portion of their inner ends transverse edge portions beneath which tapered ends of a reel base may pass and being extended beyond the same at opposite parts of their inner ends to provide portions to bear on the rod when the sleeves tend to tip under wedging action of said base, and means for holding the sleeves in mutual stressed-together relation.

WILTON B. CROSBY.